United States Patent [19]

Motter et al.

[11] 4,112,171

[45] Sep. 5, 1978

[54] AUTOMOTIVE GLAZING STRUCTURE AND METHOD OF PRODUCING THE SAME

[75] Inventors: Theodore J. Motter, Genoa; Paul T. Mattimoe; Stephen P. Bartus, Jr., both of Toledo, all of Ohio

[73] Assignee: Libbey-Owens-Ford Company, Toledo, Ohio

[21] Appl. No.: 759,331

[22] Filed: Jan. 14, 1977

Related U.S. Application Data

[63] Continuation-in-part of Ser. No. 608,830, Aug. 29, 1975, abandoned.

[51] Int. Cl.² .............................................. B32B 7/02
[52] U.S. Cl. ................................ 428/213; 427/163; 427/301; 427/302; 427/387; 428/214; 428/215; 428/410; 428/437; 428/447; 428/451; 428/483; 427/407 A

[58] Field of Search ............... 427/162, 163, 165, 301, 427/302, 384, 385, 387, 407; 428/212–215, 410, 426, 437, 446–448, 451, 480, 483, 500, 501

[56] References Cited

U.S. PATENT DOCUMENTS

| 3,388,034 | 6/1968 | McCombie | 428/215 |
| 3,650,808 | 3/1972 | Gagnon | 427/387 X |
| 3,900,655 | 8/1975 | Wolgemuth et al. | 428/215 X |
| 3,900,686 | 8/1975 | Ammons et al. | 428/215 X |

Primary Examiner—Thomas J. Herbert, Jr.
Assistant Examiner—Bruce H. Hess
Attorney, Agent, or Firm—Collins, Oberlin & Darr

[57] ABSTRACT

Multi-layer automotive glazing units that include, in their structures, transparent substrates with protective covers or shields over surfaces of the substrates and that combine penetration resistant body portions with exposed abrasion resistant surfaces; and methods of producing such units.

8 Claims, 4 Drawing Figures

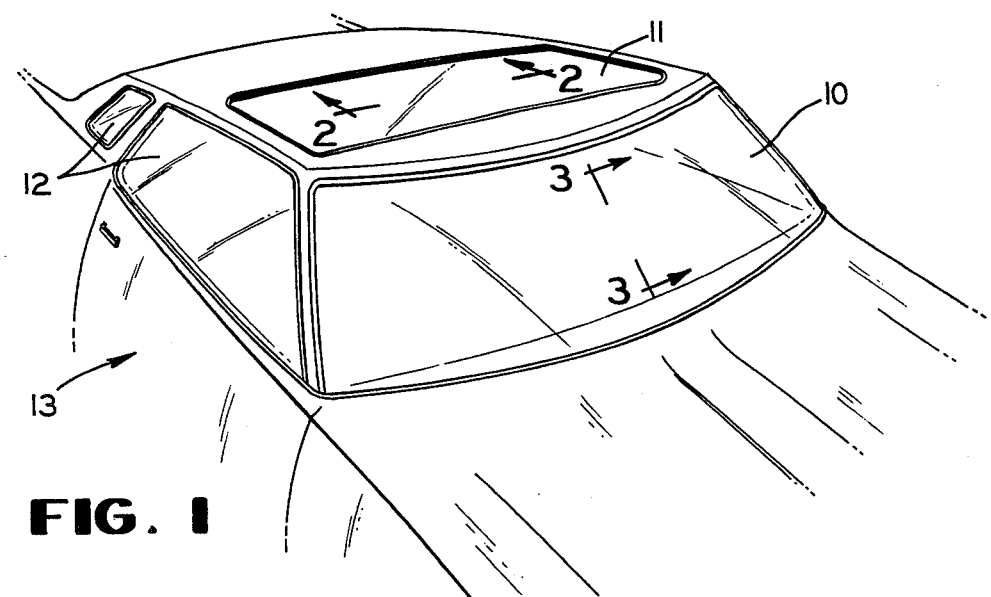
FIG. 1
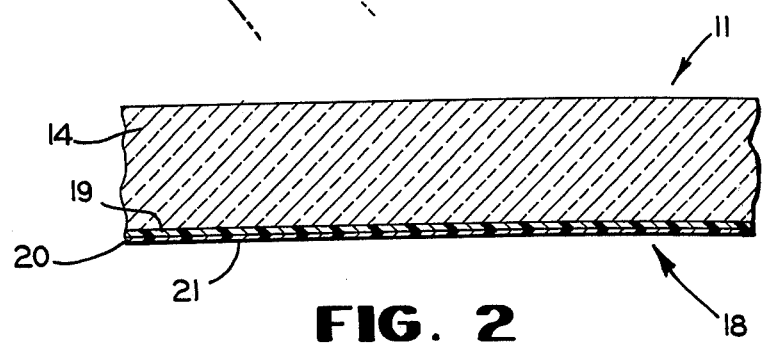
FIG. 2
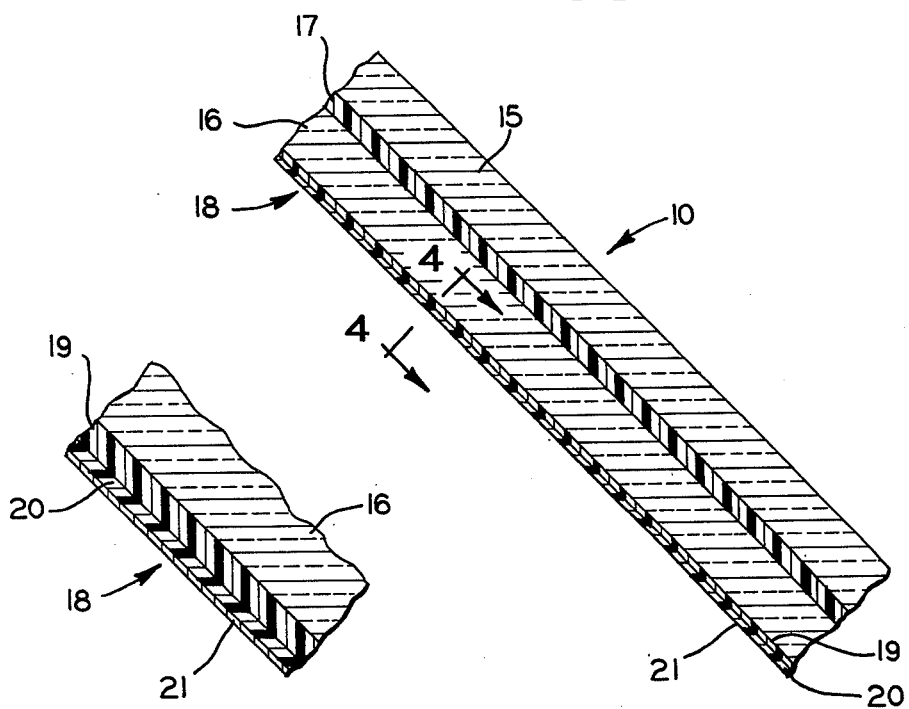
FIG. 4  FIG. 3

AUTOMOTIVE GLAZING STRUCTURE AND METHOD OF PRODUCING THE SAME

BACKGROUND OF THE INVENTION

1. Field of the Invention

The present invention relates primarily to the production of transparent structures that include abrasion and weather resistant coatings on plastic sheets and is a continuation-in-part of Motter et al. application Ser. No. 608,830 filed Aug. 29, 1975, now abandoned. More particularly it has to do with sunroofs, windshields and other automotive glazings embodying such coated sheets, and with procedures for incorporating improved coatings of this character into multi-layer glazing units.

2. Description of the Prior Art

The desirability of coating relatively soft plastic materials with a layer of harder, more scratch resistant plastic has been recognized for many years, and a considerable number of patents have issued on the subject. Similarly, the potential advantages of including layers of plastic coated in this way in automotive glazings, and with the coating providing the inboard surface of the glazing, have been appreciated. However, to date, no commercially feasible structure of this character, capable of meeting the stringent requirements for use in automotive sight openings has been found.

SUMMARY OF THE INVENTION

A multi-layer glazing unit as contemplated by this invention includes a substrate, which may take such varied forms as the conventional laminated glass structures currently required in automobile windshields in this country; or the single sheet, tempered glass glazing units commonly employed in automobile windows and backlights. On the other hand the substrate may be any other single or multiple glass sheet structure, or even an all-plastic structure. The balance of the unit, and which is carried or supported by the substrate, is a protective shield, over one surface of the substrate and the exposed surface of which is of a specially catalyzed and cured organopolysiloxane compound.

An important object of the invention is to provide an automotive glazing unit that is dimensionally and optically similar and comparable to its commercially accepted standard counterpart, but that will appreciably reduce the number and severity of lacerative injuries to persons thrown against, or otherwise brought into contact with the glazing under impact conditions; while, at the same time, exhibiting improved ability to decelerate movement of a person thrown against it without exceeding tolerable deceleration limits, and increased penetration resistance at both high and low temperatures.

Another object, when employing a glass substrate, is to materially reduce the amount of flying glass, and of resultant and personal injury to car occupants, from collisions with birds or with objects thrown from overpasses or elsewhere outside the vehicle.

Still another object is to provide materials and procedures for use in producing such glazing units that make it commercially practicable to incorporate them into automobiles being turned out on present day high volume production lines.

To understand the problems that have rendered these objects heretofore unattainable, it must be appreciated that, although a layer of any one of a large number of plastic materials secured to the inside surface of a conventional glass window or windshield with practically any adhesive, will afford occupants of the automobile some protection from lacerative injuries, it will be inadequate for present day safety requirements and will usually create more problems than it solves.

For example, there are any number of adhesives that will secure plastics to glass, but many of them also create serious optical problems when employed in automotive glazings.

Similarly, otherwise acceptable plastic sheetings may be susceptible to "denting" or "marking" with any relatively sharp or pointed implement; and to overcome this, and other marring situations incident to normal wear and possible abuse, requires not only finding the right plastic, but also employing it in a thickness that will give the "body" necessary to minimize marking.

Another problem arises from the face that such multi-layer glass-plastic structures must not only include an adequate protective cover or laceration shield, but must also be capable of surviving the so-called cold test. This is an accepted procedure in the auto industry for determining the thermo-mechanical stability of laminated structures, and involves subjecting them to a temperature of approximately $-65°$ F. until they come to equilibrium. During the test, the difference in coefficient of expansion between the glass and plastic will either rupture the bond between them or cause patches to spall off the glass surface of any unit that lacks the necessary stability.

Another problem lies in the necessity of avoiding observable birefringence color under partially polarized light, as from the North sky, when conventionally produced plastic sheeting is employed in the protective cover.

A further problem is to insure the multi-layer glazing that includes the protective cover, attaining an acceptable Severity Index. The Severity Index is a factor that has become identified with relative safety of the windshields as determined by impact tests using the 50th percentile Alderson dummy covered with two layers of moist chamois on the test sled apparatus; and is calculated by the formula:

$$S.I. = \int A^{2.5} t$$

where $A$ is acceleration in units of gravity and $t$ is the time in seconds between the moment of impact of the head of the dummy with the test windshield to the end of the deceleration pulse. The value of $A^{2.5}$ is determined for each millisecond during the time interval and the values integrated for the whole time period of the deceleration pulse.

Still another problem, and one of the most serious and most important from the optics standpoint, is that of providing acceptable resistance to weathering and wear. This problem arises with a plastic cover or shield on a glass substrate because, inherently, plastic is softer than glass. Also many plastics are quite easily and adversely affected by atmospheric conditions, so that their use in a protective cover will result in vision through the glazing unit becoming obscure after only a few weeks exposure. Since, at the same time the cover will also be subjected to the sort of scratching, abrasion, and marring which all automotive glazings encounter in any normal use, it can be understood why exposed surfaces of plastic have heretofore been generally considered unacceptable in automotive glazings.

Nevertheless the present invention makes it possible to provide acceptable and commercially feasible automobile glazings that have incorporated into their structures a protective cover or shield over the inboard glass surface that, in addition to inhibiting lacerative injuries, will not be adversely affected by exposure to the atmosphere, is unaffected by extreme cold, is clearly transparent and practically color free, does not adversely affect the Severity Index of the complete structure, and is highly resistant to marking, scratching, marring and abrasion.

BRIEF DESCRIPTION OF THE DRAWINGS

In the drawing, wherein like numerals are employed to designate like parts throughout:

FIG. 1 is a perspective view of the front end of an automobile equipped with a sun roof, windshield and side lights, all produced in accordance with the glass substrate phase of this invention;

FIG. 2 is a transverse, sectional view through the sun roof of the automobile, taken substantially along the line 2—2 in FIG. 1;

FIG. 3 is a vertical, sectional view through the windshield, taken substantially along the line 3—3 in FIG. 1; and FIG. 4 is a fragmentary sectional view, on an enlarged scale, taken substantially along the line 4—4 in FIG. 3, and illustrating the laminar structure of the protective cover that is bonded to the inboard glass surface.

DESCRIPTION OF THE PREFERRED EMBODIMENTS

As illustrated in FIG. 1, a windshield 10, sun roof 11 and side windows 12 made according to the invention can be mounted in an automobile 13, and will appear like ordinary automotive glazings of conventional construction. Moreover, as shown in FIGS. 2 and 3 respectively, the glass substrate of the multi-layer, glass-plastic sun roof 11 may consist of a single sheet of tempered glass 14, while the glass substrate of the windshield 10 may be conventional laminated safety glass comprising two sheets of glass 15 and 16 bonded together, under heat and pressure, by an interposed layer 17 of plastic.

In a preferred embodiment, the plastic interlayer 17 of the laminated glass in the windshield 10 is a 0.030 inch thick sheet of the high penetration resistant polyvinyl butyral disclosed in U.S. Pat. No. 3,231,461, while the glass sheets 15 and 16 are sheets of float glass, in thicknesses between 0.085 inch and 0.110 inch, bonded to the interlayer 17 with the "bath" surfaces out, as described in U.S. Pat. No. 3,708,386.

Similarly, in a preferred sun roof embodiment, the single glass sheet 14 is of semi-tempered, or partially heat-treated, float glass approximately 0.100 inch thick and with its "bath" surface to the outside. Also the glass in the sun roof is preferably tinted, colored, rendered phototropic or otherwise provided with means for filtering light.

Although some specific glass types and thicknesses have been set forth above, the glass substrate of the glazing structures of this phase of the invention may be in sheets or layers that vary from approximately 0.040 inch up to ⅛ inch and beyond in thickness; and any plastic interlayers within these glass parts may be in thicknesses between 0.015 and 0.060 inch. For this reason it may also be necessary or desirable to somewhat vary the thickness and/or makeup of the plastic in the part of the structure carried by the substrate and which, as best shown in FIG. 4, is here in the form of a three layer protective cover or shield 18 that is bonded to the inboard surface of the glass substrate of the windshield 10, the sun roof 11, or the side window 12.

However the primary considerations for the cover or shield 18 are that it include an interior or body portion that will not detract from or adversely affect the basic glazing structure, that it exhibit acceptable optical properties, and that it be capable of acting to decelerate and resist penetration by a human head or other object thrown against it while, at the same time, presenting an exposed surface capable of effectively withstanding atmospheric exposure and the wear to which the inside of every automotive glazing is subjected during normal continuing usage.

On this premise, the make up of the shield 18, shown in FIG. 4, and the thickness of its layers as indicated there, are preferred ones for incorporation into a windshield glazing that includes a laminated glass substrate such as has been described in connection with FIG. 3. More particularly, this shield 18 comprises an approximately 0.015 inch thick layer 19 of a relatively soft, extensible plastic material such as polyvinyl butyral, adhered to the inboard surface of the inboard glass sheet 16; an approximately 7 mil (0.007) thick layer 20 of a more durable plastic such as a polyethylene terephthalate of the character sold by du Pont under their trade mark "Mylar;" and an approximately 4 micron (0.156 mil) thick coating or layer 21 of a harder and abrasion resistant plastic material such as a cured organopolysiloxane compound of the character generally discussed in U.S. Pat. Nos. 3,457,221, 3,460,980, 3,451,838 and 3,650,808.

It is evident from this that the individual and separate elements and materials of which the glazing structures of this invention are composed may be known and, in some cases, are readily available commercially. Nevertheless, when these materials and separate components are combined and used in the manner contemplated by the invention, and employing the procedures to be hereinafter described, surprisingly new, useful and unexpected results are obtained.

Thus, in the particular shield structure of FIG. 4, the layer 19 may be said to function primarily as an adhesive, but it also acts to cushion impact and, because of its elasticity and extensibility, to assist in resisting penetration by the head of a driver or passenger that may be thrown against the windshield.

The layer 20, with its greater durability, functions to protect the softer and less durable layer 19, can provide a weathering resistant surface and carries the harder coating layer 21. Both of the layers 19 and 20 are non-lacerative, i.e., they will not cut or tear the skin even when an impact occurs that is of sufficient magnitude to penetrate the plastic shield, and the layer 21 presents a surface hard enough to resist wear, weathering and other abuse without itself constituting a lacerative hazard.

Still more specifically, the plastic in the layer 20 may be in thicknesses of from 1/2 to 14 mils and, when polyethylene terephthalate is used, adequate adhesion to the layers 19 and 21 can be assured by subjecting it to a surface conditioning treatment, which may be carried out electrically or chemically, but is preferably done by direct contact with a gas flame for a length of time sufficient to alter the surface characteristics but not the bulk properties of the material. However, in lieu of the polyethylene terephthalate, other terephthalate esters and other plastic materials including polyesters, polycarbonates, polyurethanes, acrylics and polyvinyl fluorides may be employed.

Whatever the materials used in its layers, however, the matter of the overall thickness of the protective multilayer plastic cover or shield 18 is significant.

Thus, a layer 20 of polyethyleneterephthalate, as the durable plastic, that is no more than 0.005 to 0.014 inch thick will insure the glass-plastic glazing passing the "cold test," because it exerts only a slight effect on the structure; and this is especially true on the structure, and against the beam strength, of a laminated glass part as shown in FIG. 3. However, to provide sufficient "body" to avoid marking, the layer 20 alone should be between about 5 and 10 mils thick. At the same time, to insure adequate balance, and a Severity Index within the acceptable range, the combined thicknesses of the interlayer 17 (of the laminated glass part of the unit) and the adhesive layer 19 of the shield should not exceed 0.065 inch, and the combined thicknesses of layers 17, 19 and 20 should not exceed 0.75 inch.

In this connection, when the substrate of the glazing is a single glass sheet, as in a window, or the sun-roof structure of FIG. 2, it is preferred to increase the thickness of the adhesive layer 19; for example, from the 0.015 inch preferred with the laminated glass part of FIG. 3, to 0.030 inch.

In producing the glazing units of the glass substrate phase of the invention, it has been found practicable to coat the layer of durable plastic 20 of the protective shield with the harder, abrasion resistant layer or coating 21 before incorporating the coated layer into, either the sun roof panel of FIG. 2 by bonding the plastic layer 20 to the heat treated glass sheet 14, or the windshield structure of FIG. 3 by bonding the plastic layer 20 to what is to become the inboard glass sheet 16 of the laminated glass unit, by means of the relatively softer plastic layer 19.

Accordingly, the following are examples of procedures that have been successfully used in coating several kinds of durable plastic materials to prepare them for incorporation, as part of a protective cover or laceration shield, into a multilayer, glass-plastic, automotive glazing unit.

EXAMPLE I

A sheet of polyethylene terephthalate ("Mylar") 0.007 inch thick, that has been flame treated on the side to which the abrasion resistant coating was to be applied, was washed with isopropanol, blown dry, and then flow coated with a primer made of 0.9 of a gram of a liquid epoxy resin having an epoxide equivalent of 175 to 210 (Epon 828), 0.1 gram of N-beta (aminoethyl)-gamma-aminopropyl-trimethoxysilane (Union Carbide's A-1120), and 0.005 gram of an ultra violet ray absorbent ("Uvinul 400") in 100 ml. of cellosolve; after which it was air dried for 15 minutes. The primed sheet was then flow coated with a 25% solution of a further curable organopolysiloxane compound (to be more fully hereinafter described) in butanol. The wet coating was partially air dried in a clean room atmosphere for 5 minutes and, while still moist, was itself flow-coated with a catalyst in the form of a 5% solution of the same A-1120 silane (the structural formula of which is $NH_2(CH_2)_2NH(CH_2)_3Si(OCH_3)_3$) that was used in the prime coat, in butanol. The organopolysiloxane coating was cured by allowing the coated sheet to stand for one week at room temperature, after which it was bonded, with its coated side out, to a sheet of float glass, with a polyvinyl butyral interlayer therebetween, at about 225 psi and 300° F. for 10 minutes.

EXAMPLE II

Another "Mylar" sheet was coated as described in Example I except that tetraisopropyl titanate was substituted for the silane in the priming solution; the catalyst solution was made up to include a silicone release agent by dissolving 5 grams of the A-1120 and 0.25 gram of Union Carbide's L-522 (a silicone resin having a surface tension of 21.6 dynes per centimeter at 25° C.) in 100 ml. of butanol; and the coating was allowed to stand for only 4 days at room temperature.

The sheet with the cured coating was then laminated with an untreated glass cover plate over the coating and which, because of the parting agent "built into" the catalyst solution, was easily removed, leaving a clear, bright, colorless, transparent, abrasion resistant coating. Otherwise, because it is necessary, in order to insure good optical quality, to use a cover plate over the coated "Mylar" in laminating, or in bonding the protective cover to glass, and because regular float glass, for example, tends to adhere to the abrasion resistant coating, it would be necessary to wax coat the cover plate before using.

EXAMPLE III

To check the possibility of the laminating process having an effect on the curing of the abrasion resistant coating, another sheet of "Mylar" was coated as described in Example II, and allowed to stand at room temperature for 19 days.

EXAMPLE IV

Still another sheet of flame treated polyethyleneterephthalate ("Mylar") 0.007 inch thick, was subjected to substantially the same treatment as in Example I, except that tetraisopropyl titanate was substituted for the A-1120 silane in the priming solution; after air drying, the primed sheet was heated 15 minutes at 250° F.; a 30%, instead of a 25%, solution of the organopolysiloxane was flow coated over the primed surface; and finally, after catalyzing as described in Example I, the coating was cured by heating in the oven for 1 hour at 250° F.

The so coated and cured sheet was then bonded to a sheet of float glass as in Example I.

EXAMPLE V

Another 0.007 inch thick, flame treated, sheet of polyethylene terephthalate was treated in the same way as that in Example IV, except that the catalyst was incorporated into the organopolysiloxane coating solution, but this resulted in a reduction in the pot life of the solution, and in the weatherability of the coating, that made it commercially impracticable.

Above examples I to IV are illustrative of production procedures in connection with the glass substrate phase of the invention, and employing either heat or room temperature curing techniques. However, essential features of the inventive method involved, particularly as regards coating procedures are equally applicable to the production of units embodying essentially plastic substrates. Such multi-layer units can, for example, be substituted for the plastic side windows sometimes used in buses or the like, and may require no more than the application of the organopolysiloxane abrasion resistant coating to the surface of a reasonably thick sheet of a suitable plastic material.

The following examples, although not limited thereto, are illustrative of this concept:

EXAMPLE VI

A sheet of an acrylic resin, polymethyl methacrylate ("Plexiglas") was washed with isopropanol, blown dry, and then flow coated with a primer made of 0.9 of a gram of a solid epoxy resin having an epoxide equivalent of 1500 to 2000 (Shell's "Epon" 1007) and 0.1 gram of N-beta (aminoethyl)-gamma-aminopropyl-trimethoxysilane (Union Carbide's A-1120) in 85 ml. of cellosolve and 15 ml. of xylene; after which it was air dried in a clean room atmosphere and then heated for 20 minutes in an air circulating oven at 165° F. After cooling to room temperature the primed sheet was flow coated with a 25% solution of the further curable organopolysiloxane compound of Example I in a solvent made up of 97% butanol and 3% xylene. The wet coating was partially air dried in a clean room atmosphere for 5 minutes and, while still moist, was itself flow-coated with a catalyst in the form of a 5% solution of the same A-1120 silane that was used in the prime coat, in butanol. After air drying the organopolysiloxane coating was finally cured by heating the coated sheet in an air circulating oven for 1 hour at 165° F.

EXAMPLE VII

Another sheet of polymethyl methacrylate was treated identically to the one in Example VI, except that it was not heated to finally cure the coating, but was allowed to stand at room temperature for 15 days.

EXAMPLE VIII

A sheet of a polycarbonate ("Lexan") was treated in the same manner as the plastic sheet in Example VI except that the priming solution contained only 0.45 gram of epoxy resin and 0.05 gram of the A-1120 silane; the primed sheet was flow coated with the solution of the further curable organopolysiloxane compound immediately after being air dried; and, after catalyzing, the organopolysiloxane coating was heated for one hour at 250°, instead of 165° F., to finally cure it.

EXAMPLE IX

Another sheet of "Lexan" was treated exactly as the one in Example VIII, except that the priming solution used in the surface treatment contained 0.9 gram of the resin and 0.1 gram of the silane; and, after catalyzing, instead of heating to cure, the organopolysiloxane coated sheet was allowed to stand 15 days in the laboratory.

In connection with the experiments leading up to those reported in the above examples, various organopolysiloxane compounds of the character described in the patents already referred to, and that provided coatings with $SiO_2$ contents above 50% were tried, and improved abrasion resistant substrate covers produced. However best results were obtained when an hydrolysis and condensation product of methyltriethoxysilane that, when fully cured, was approximately 89% $SiO_2$ was employed as the solvent soluble, further curable organopolysiloxane compound in flow coating the surface treated plastic sheets to provide the abrasion resistant surfaces.

The ultra violet ray absorbent material, included in the priming solution in Examples I, II and III, can as well be added to the solution of the organopolysiloxane as and if needed.

Primers were used in the surface treatment of the more durable plastic sheets in all of the examples and, in all cases the primers used were reaction products of film forming resins, preferably epoxy resins, with compounds capable of hydrolysis followed by condensation, preferably amino functional alkoxy silanes or titanates; and the primer ingredients were mixed at least 16 hours prior to application to allow them to react. However, as indicated above, suitable treatment of the plastic surface to be coated may be either a physical or a chemical treatment and may or may not include a priming step as that term is generally understood.

The abrasion resistant coating on the product of each example was evaluated by the Taber abrasion test which is described in ASTM Test D-1044-56. Specifically, for the instant purpose, a 500 gram load was applied to the CS-10F wheels, and the percent of haze in the track of the test was determined after 100, 200 and 300 revolutions respectively.

For purposes of comparison, uncoated control samples of the "Mylar" sheets used in Examples I to V, the "plexiglas" sheets of Examples VI and VII, and the "Lexan" sheets of Examples VIII and IX were first subjected to the test with the following results:

|  | 100 Revs. | 200 Revs. | 300 Revs. |
| --- | --- | --- | --- |
| "Mylar" | 47.0% |  |  |
| "Plexiglas" | 36.5% | 36.6% | 37.8% |
| "Lexan" | 40.0% | 45.6% | 46.0% |

In the case of the "Mylar," the control sample was considered worthless for vision after 100 revolutions and the test discontinued. With the "Plexiglas" the sample was about as badly damaged after 100 revolutions as it could get.

Thereafter, the abrasion resistant coatings produced in the examples, were tested in the same way as the uncoated control samples, and developed only the following haze percentages:

|  | 100 Revs. | 200 Revs. | 300 Revs. |
| --- | --- | --- | --- |
| Example I | 2.5% | 5.2% | 6.9% |
| Example II | 2.0% | 4.0% | 6.0% |
| Example III | 3.2% | 7.3% | 9.8% |
| Example IV | 2.5% | 3.8% | 7.6% |
| Example VI | 1.9% | 5.4% | 8.6% |
| Example VII | 3.9% | 7.5% | 11.5% |
| Example VIII | 3.2% | 7.0% | 10.9 |
| Example IX | 3.8% | 7.7% | 10.0% |

The products of Examples I and IV, and also the coated plastic sheets of any of Examples II, III and VI to IX, if and when bonded to a compatible glass part in the manner described in Examples I and IV, constitute glazing units as contemplated by the glass substrate phase of this invention; the use of a cover plate, as outlined in Example II, insures preservation of the optical quality of the exposed plastic surfaces of the units; and they have been considered acceptable, and as meeting code requirements for automotive glazings, when they exhibit haze percentages that do not exceed 5% after 100 revolutions, 8% after 200 and 12% after 300.

Finally, while the general purpose and function of the relatively soft layer 19, the more durable layer 20, and the abrasion resistant layer 21, in the shield 18, of the glass substrate phase of the invention have been set forth above, it must be appreciated that the particular manner in which the coating 21 is applied, both in this and in the plastic substrate phase, is of prime importance, not only in insuring that it adequately serve its intended purpose, but also in attaining maximum efficiency and peak performance in the completed structure.

Thus, among the important steps in applying the coating 21 are the preparation of the layer 20 to receive the coating by a suitable surface treatment, which may be either physical or chemical, and the catalyzing of the coating after it has been applied and before it is completely dry.

This special catalyzing procedure makes it possible to finally cure the further curable organopolysiloxane in the abrasion resistant coating, which final curing had customarily required high temperature-extended time curing cycles, at room temperature or at elevated temperatures for short periods. Additionally, the manner in which the coating 21 is laid down, and the subsequent application of the catalyst to its outer surface, are responsible for setting up a gradual hardening of the applied coating outwardly from the layer 20 to which it is applied, and for providing a finished coating that is progressively harder through its thickness as it approaches its outside surface, thus giving it, in essence, a case hardened effect.

Similarly, the cumulative importance of the application procedure, and of the low thermal expansion primer, where that is employed in the surface treatment, aid in producing the remarkably hard surface, approaching that of glass, that is attained on the exposed outer surface of the shield 18, with a sub structure that permits accommodation to stresses, thus avoiding the objectionable surface cracking or crazing that has heretofore accompanied the desired degree of hardness in such coatings.

It is to be understood that the forms of the invention herein shown and described are to be taken as preferred embodiments only of the same, and that various changes in the size, shape, and arrangement of parts, as well as various procedural changes, may be resorted to without departing from the spirit of the invention as defined in the following claims.

We claim:

1. A transparent, temperature stable, glazing structure, comprising the combination: with a surface of glass; of a layer of a relatively soft and extensible, penetration resistant, plastic having one surface bonded to said glass; a thinner layer of a more durable plastic having one surface bonded to said relatively soft layer and its opposite surface treated to promote adhesion; an abrasion resistant coating of a cured organopolysiloxane compound on said treated surface; and an exposed surface on said coating that has been silane catalyzed before curing to impart the highest degree of cure at said exposed surface and to render said coating progressively harder outwardly through its thickness toward said exposed surface.

2. A transparent, temperature stable, glazing structure, comprising the combination: with a surface on a sheet of approximately 0.100 inch thick float glass of a relatively soft extensible, penetration resistant layer of polyvinyl butyral plastic in a thickness between approximately 0.015 inch and 0.030 inch having one surface bonded to said glass surface; a thinner layer of a more durable polyester plastic in a thickness between approximately 0.005 inch and 0.014 inch having one surface bonded to said relatively soft layer and its opposite surface treated by priming the same with a reaction product of a film forming resin and a compound capable of hydrolysis followed by condensation; an abrasion resistant coating of a cured hydrolysis and condensation product of a silane selected from the group consisting of methyltriethoxy silane and a mixture of methyl and phenyltriethoxy silanes on said treated surface; and a silane catalyzed exposed surface on said cured coating.

3. A glazing structure as defined in claim 2, in which said sheet of float glass is one of the glass sheets in a laminated safety glass unit comprising two sheets of glass and an interposed layer of plastic, the combined thickness of said interlayer and said relatively soft layer is not appreciably greater than 0.065 inch, the combined thicknesses of said interlayer, said relatively soft layer and said layer of more durable plastic is not appreciably greater than 0.075 inch, said film forming resin is an epoxy resin and said compound capable of hydrolysis followed by condensation is one selected from the silanes and titanates, and said silane catalyst comprises N-beta (aminoethyl)-gamma-aminopropyl-trimethoxy silane.

4. In a method of producing a transparent, temperature stable, multiple layer structure, the steps of: treating the surface of a clean sheet of a durable plastic to promote adhesion by priming said surface with a solution of a reaction product of a film forming resin with a compound capable of hydrolysis followed by condensation, coating said treated surface with a further curable hydrolysis and condensation product of methyltriethoxysilane, and applying a coating of a silane as a catalyst to the exposed surface of said coating before further curing the same.

5. A method as defined in claim 4, in which said catalyst comprises N-beta (aminoethyl)-gamma-aminopropyl trimethoxy silane.

6. A method as defined in claim 4, in which said hydrolyzable compound in said priming solution is tetraisopropyl titanate.

7. A method as defined in claim 4, in which said primer is a reaction product of an epoxy resin and a silane containing an amine group, said coating is partially dried, but said catalyzing solution is applied while said coating is still moist.

8. A method as defined in claim 7, in which said primer is a reaction product of an epoxy resin and the N-beta (aminoethyl)-gamma-aminopropyl-trimethoxy silane having the structural formula $NH_2 (CH_2)_2 NH(CH_2)_3 Si(OCH_3)_3$.

* * * * *

UNITED STATES PATENT AND TRADEMARK OFFICE
CERTIFICATE OF CORRECTION

PATENT NO. : 4,112,171

DATED : September 5, 1978

INVENTOR(S) : Theodore J. Motter et al

It is certified that error appears in the above–identified patent and that said Letters Patent are hereby corrected as shown below:

Col. 2, line 17, "face" should be --fact--
Col. 5, line 9, "0.005" should be --0.0005--
        line 22, "0.75" should be --0.075--
Col. 10, line 43, "coating" should be --solution--

Signed and Sealed this

Twenty-fourth Day of April 1979

[SEAL]

Attest:

RUTH C. MASON
Attesting Officer

DONALD W. BANNER
Commissioner of Patents and Trademarks